US011076292B1

(12) United States Patent
Wilson et al.

(10) Patent No.: US 11,076,292 B1
(45) Date of Patent: Jul. 27, 2021

(54) SYSTEM AND METHOD FOR IMPLEMENTATION OF PCRF AND PCEF FUNCTIONS IN A VEHICLE

(71) Applicants: RJWilson, Inc., Duluth, GA (US); SkeensMcDonell Group LLC, Sugar Grove, IL (US); VectoIQ LLC, New York, NY (US)

(72) Inventors: Randall J. Wilson, Duluth, GA (US); Howard K. McDonell, Aurora, IL (US); Mary S. Chan, Chatham, NJ (US)

(73) Assignees: RJWilson, Inc., Duluth, GA (US); SkeensMcDonell Consulting Group LLC, Sugar Grove, IL (US); VectoIQ LLC, New York, NY (US)

( * ) Notice: Subject to any disclaimer, the term of this patent is extended or adjusted under 35 U.S.C. 154(b) by 185 days.

(21) Appl. No.: 16/231,352

(22) Filed: Dec. 21, 2018

(51) Int. Cl.
| | | |
|---|---|---|
| G06F 15/173 | (2006.01) | |
| H04W 12/08 | (2021.01) | |
| H04L 12/851 | (2013.01) | |
| H04W 28/02 | (2009.01) | |
| H04L 12/813 | (2013.01) | |
| H04W 4/48 | (2018.01) | |

(Continued)

(52) U.S. Cl.
CPC ............ *H04W 12/08* (2013.01); *H04L 47/20* (2013.01); *H04L 47/2433* (2013.01); *H04L 47/2441* (2013.01); *H04L 63/0428* (2013.01); *H04L 63/20* (2013.01); *H04W 4/48* (2018.02); *H04W 12/37* (2021.01); *H04W 28/0221* (2013.01)

(58) Field of Classification Search
CPC ............ H04W 12/08; H04W 28/0221; H04W 12/0027; H04W 4/48; H04L 47/2433; H04L 63/20; H04L 47/20; H04L 63/0428; H04L 47/2441
USPC .......................................................... 726/1
See application file for complete search history.

(56) References Cited

U.S. PATENT DOCUMENTS

| 9,819,777 B1 | 11/2017 | Alam et al. |
| 2006/0128301 A1 | 6/2006 | Dorfstatter et al. |
| 2011/0013569 A1 | 1/2011 | Scherzer et al. |

(Continued)

FOREIGN PATENT DOCUMENTS

| CN | 103686656 | 3/2014 |
| KR | 101437365 | 12/2012 |

(Continued)

*Primary Examiner* — Jeffrey C Pwu
*Assistant Examiner* — Nega Woldemariam
(74) *Attorney, Agent, or Firm* — Margaret Millikin

(57) ABSTRACT

Disclosed is a method of controlling access to mobile radio connection(s) in a vehicle, having a policy and charging enforcement function with deep packet inspection capabilities "vePCEF" and optionally a policy and control rules function "vePCRF" in the vehicle. Furthermore, a Man In The Middle (MITM) methodology can be employed within the vehicle PCC architecture to enhance the enforcement of the PCRF/vePCRF policies. Also disclosed is a vehicle containing a PCC architecture having a MITM functionality. Also disclosed is a method of controlling access to mobile radio connection(s) in a vehicle, having a policy and charging enforcement function with deep packet inspection capabilities "vePCEF" which interfaces to a mobile core network PCRF or a cloud based PCRF.

29 Claims, 5 Drawing Sheets

(51) Int. Cl.
*H04L 29/06* (2006.01)
*H04W 12/37* (2021.01)

(56) References Cited

U.S. PATENT DOCUMENTS

| | | | |
|---|---|---|---|
| 2012/0166618 A1* | 6/2012 | Dahod | H04W 28/02 |
| | | | 709/224 |
| 2012/0331516 A1 | 12/2012 | Perez et al. | |
| 2014/0086177 A1* | 3/2014 | Adjakple | H04L 67/10 |
| | | | 370/329 |
| 2014/0204746 A1 | 7/2014 | Sun et al. | |
| 2015/0195858 A1 | 7/2015 | Jin et al. | |
| 2015/0296440 A1 | 10/2015 | Forssell et al. | |
| 2016/0127850 A1 | 5/2016 | Kao | |
| 2017/0034860 A1 | 2/2017 | Berggren et al. | |
| 2017/0118616 A1 | 4/2017 | Kothari et al. | |
| 2017/0288886 A1 | 10/2017 | Atarius et al. | |
| 2017/0366679 A1 | 12/2017 | Mohamed et al. | |

FOREIGN PATENT DOCUMENTS

| | | |
|---|---|---|
| WO | WO2010129939 | 11/2010 |
| WO | WO2012142437 | 10/2012 |
| WO | WO2013163599 | 10/2013 |
| WO | 2015172079 | 11/2015 |

\* cited by examiner

ID OF THE PRESENT INVENTION

SYSTEM AND METHOD FOR IMPLEMENTATION OF PCRF AND PCEF FUNCTIONS IN A VEHICLE

FIELD OF THE PRESENT INVENTION

The systems and methods described herein relate generally to use of mobile computing and communication devices in vehicles, and, more particularly to systems and methods that use in-vehicle policy-based protocols (vePCEF or vePCRF and vePCEF) or policies for selectively controlling or managing the use and communications to and from such mobile devices while in the vehicle.

BACKGROUND

Existing cellular network management approaches include centralized policy enforcement and charging at a gateway node in cellular networks. With such approaches, however, even those calls which fall under the same base station have to traverse the central gateway node to enforce policy and to get billed. Enforcing policy in the core requires all traffic, including traffic that may be blocked or throttled to traverse the air link which is the critical bandwidth resource. This results in increased bandwidth pressure on the core links.

A connected vehicle is a vehicle that is equipped with Internet access, and usually also with a wireless local area network (WLAN). This allows the car to share internet access with other devices both inside as well as outside the vehicle. Often, the car is also outfitted with special technologies such as GPS, sensors and other safety devices that share the internet or wireless LAN and provide additional benefits to the vehicle owner.

The introduction of connected vehicles creates the need for vehicle owners to manage the usage of the mobile connection (internet access). Vehicles will have multiple types of passengers, each attaching to the core mobile network via a WiFi radio and vehicle mobile radio in the vehicle. The vehicle owner will want to limit different users in terms of what they can and cannot do over the vehicle WiFi radio and vehicle mobile radio. This creates the need to have multiple user usage policies and the ability to enforce those policies. The core mobile network comprises several functional entities, including MME (Mobility Management Entity), HSS (Home Subscriber Server), SGW (Serving Gateway), PGW (Packet Data Network Gateway), PCRF (Policy and Charging Rules Function), and PCEF (Policy and Charging Enforcement Function). The core mobile network will be referred to herein as the core mobile network, the core network, or the network.

The vehicle owner is responsible for the vehicle mobile radio connection including the usage cost and ensuring legal usage of the connection to the core mobile network (legal liability). This drives the need to be able to apply usage policies and security features to each individual user depending on their defined service level category. The policy management may be used to manage the bandwidth capacity (i.e. the data entering the core mobile network) to ensure that all users have a fair share of the bandwidth capacity.

Key vehicle control information is also communicated over a vehicle mobile radio to assist with autonomous driving and vehicle safety. This communication can be via a separate radio from the one used by the vehicle passengers, or it can be a single shared radio connection. Security of all connected devices is critical, especially when the security risk can lead to safety issues. Two key safety issues in connected vehicles include: 1) infection of devices from malicious software, 2) vehicle safety threats from malicious activity, e.g. distributed denial of service ("DDoS") attack overloading processing capacity which can block or slow needed actions to prevent accidents or other events.

In existing practice, current policy solutions are applied in a centralized fashion at the core mobile network using standard policy functions. This existing practice does not optimize the traffic flow over the network bandwidth as all traffic, including traffic that will be blocked is required to be carried to the core mobile network. There remains a need to provide more efficient policy control to help reduce the traffic over the network bandwidth to the core mobile network.

Additionally, the available network bandwidth needs to be prioritized to ensure that critical vehicle data gets transmitted ahead of other data being used by WiFi connected devices in the vehicle. Performing this function in the vehicle rather than in the core mobile network is more efficient and can be performed at a more granular level.

Additionally, the core mobile network architecture performs policy and charging management on the device terminating vehicle mobile radio and not on the individual devices sitting behind the vehicle mobile radio, i.e. the WiFi and hardwired connections to the WiFi radio router or other network access point.

Existing security is applied in the end user device for prevention of viruses, bots, and other malicious software. This requires each device to have software solutions which use device resources which can limit the utilization of the device from degraded performance and shorter battery life. Current DDoS prevention solutions are implemented at the network level. The detection and blocking actions are triggered by high volumes of transactions (e.g. setup messages). If a perpetrator wanted to target a vehicle for malicious reasons, they could implement a DDoS attack on that specific vehicle, which may not trigger a network level event but could cause safety issues as the DDoS attack consumes processor and bandwidth resources needed for safe vehicle operations.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
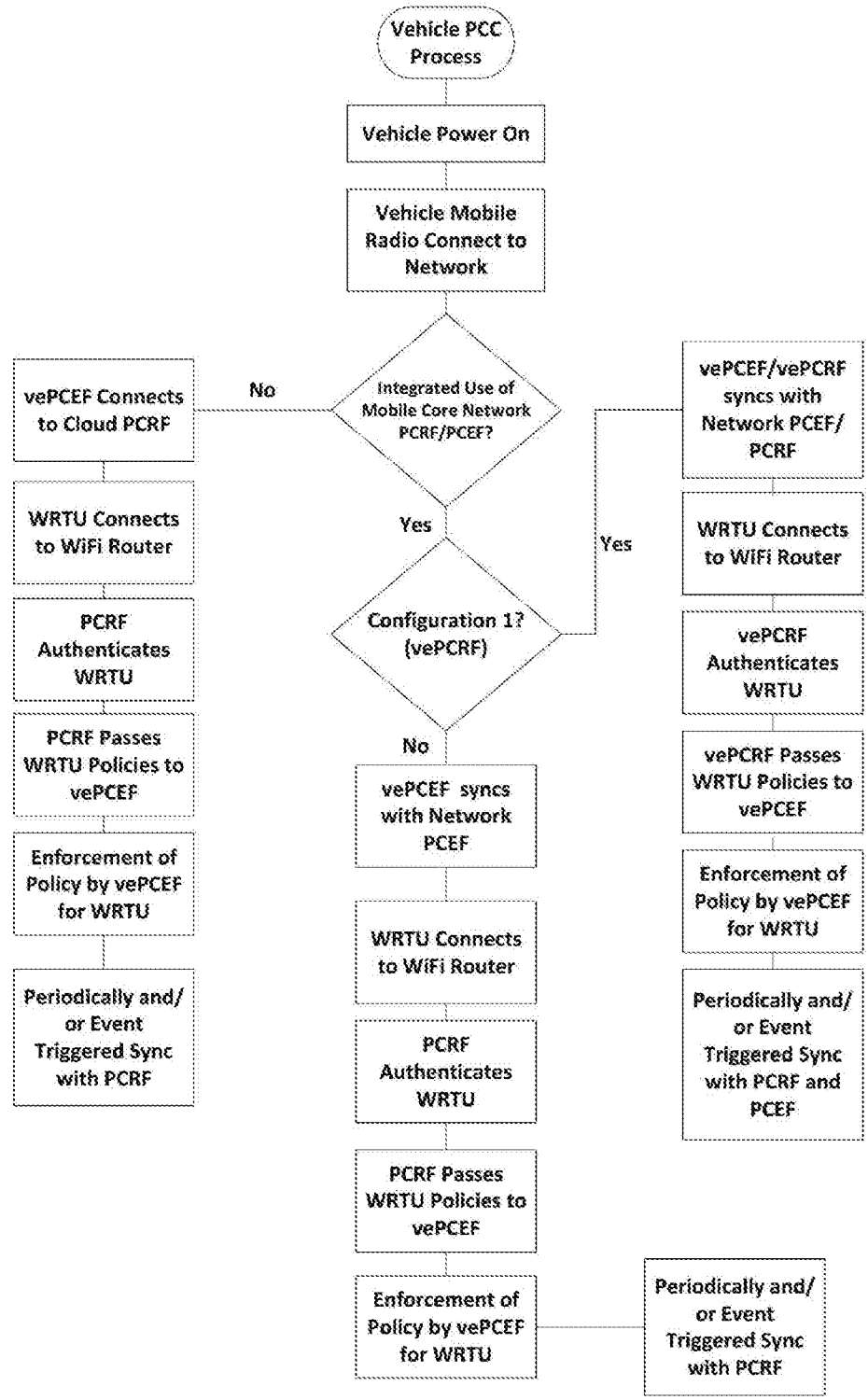
FIG. 1 is a logic flow chart depicting an exemplary operation of the system and method of the subject invention.

Turning now to FIG. 1, the invention centers on pushing the policy management functionality out of the network so that policy and charging control is enforced prior to entering the network. The policy management function contains the key information required for providing assigned and subscribed services and enforcement of those services. Pushing all or a portion of this functionality to the edge of the network has value in more efficiently using network resources and improving performance to the subscriber.

Policy management function architecture or Policy Control and Charging ("PCC") is generally comprised of PCRF (Policy and Charging Rules Function) and PCEF (Policy and Charging Enforcement Function). PCRF and PCEF are related functional entities, which include policy control decision making and flow-based charging control functionalities. PCRF is generally designed to provide network control policies relating to the service data flow detection, Quality of Service ("QoS"), and flow-based charging controlling to the PCEF. PCEF generally provides user traffic handling and QoS and is also generally responsible for providing service data flow detection, usage volume along with online and offline charging interactions.

The term "vehicle" is intended to include any type of device or machine that is driven, operated, or controlled by a user (i.e., driver) and any device or machine that is autonomously driven.

As used herein, "mobile devices" are referred to as wireless transmit/receive unit ("WTRU") and are intended to include and encompass any type of hand-held or mobile device or other computing or communication device usable within a vehicle, such as but not limited to cell phones, smart phones, push-to-talk devices, PDAs, text or email dedicated devices, general computers, laptops, electronic reading devices, multimedia equipment, data tablets, and similar computing or communication devices having a display or interface that is usable by or accessible to a user and is capable of connecting to WiFi.

Functions on the WTRU include, but are not limited to, one or more of: making an outgoing call, receiving an incoming call, push-to-talk, sending or receiving a text message, text chatting, sending or receiving an email, internet browsing, and launching of a specified application installed on the WTRU.

This invention introduces policy management functionality into the vehicle. This functionality can be implemented as part of an electronic module containing the vehicle mobile radio (the radio that transmits and receives data from the network cell sites) or as a separate electronic module that communicates with the vehicle radio module, and provides policy definition, policy enforcement, and enhanced security using deep packet inspection ("DPI") techniques. Deep Packet Inspection (DPI) identifies protocols & applications based on unique characteristics, either deterministic (e.g., pattern matching, topology), stochastic, or behavioral. It uses a variety of methods for accurate traffic classification such as string match analysis, numeric based analysis, statistical and behavioral analysis, state based analysis and others. The in-vehicle electronic module(s) comprise a) a WiFi radio or other device for connecting the in-vehicle devices (such as WTRU and/or vehicle sensor data transmitting via WiFi) with a vehicle network access device b) a vehicle network access device that aggregates all data coming from the vehicle (both hardwired and WiFi), and c) a vehicle mobile radio interfacing with the network cell site(s) and ultimately the core mobile network. The policy management functionality of the invention is located after the network access device but before the vehicle mobile radio. As used herein, a network access device includes routers, routing switches, integrated access devices (IADs), multiplexers, a variety of metropolitan area network (MAN) devices, wide area network (WAN) access devices and other devices that provide an access point into a core mobile network. As used herein, a mobile radio includes two-way wireless communication systems and devices based on radio frequencies where the path of communication is moveable at either end.

vePCRF and vePCEF (Integrated Architecture)

With continuing reference to FIG. 1, one embodiment of this invention is an integrated solution that implements a policy and charging enforcement function in a vehicle ("vePCEF" or a "vePCEF and a "vePCRF") that interoperate with the PCRF and PCEF located in the mobile core network. In this solution there are two configurations. Configuration 1 has a vePCEF and a vePCRF implemented in the vehicle. The vePCEF and the vePCRF communicate/synchronize with the core mobile network PCEF and PCRF. The synchronization will occur on a periodic basis and on event triggers. Triggered updates happen upon defined events, such as turning the car off or hitting a quota, for example. The vePCEF gets the policies from the vePCRF on a per WRTU basis and enforces them on a per WRTU basis. Configuration 2 has only a vePCEF in the vehicle. The vePCEF connects to the core mobile network PCRF to receive policies for each connected WRTU. The vePCEF also syncs with the mobile core network PCEF on a periodic basis and on an event triggered basis. Triggered updates happen upon defined events, such as turning the car off or hitting a quota, for example. In both configuration 1 and configuration 2 the individual WRTU policies are configured by the vehicle owner or an account administrator. These policies can be established by selecting from a set of policies pre-defined by the vehicle owner/administrator, or optionally by customizing a set of policies for a specific WRTU.

Providing policy control at the vehicle helps to reduce the traffic over the network bandwidth to the core mobile network. This invention allows a PCEF function to be implemented in the vehicle which reduces the amount of network traffic and permits application of PCEF at the WTRU level. It also permits a more accurate identification of traffic via the implementation of MITM which significantly improves the ability of the vePCEF to accurately implement the policies defined by the network or cloud based PCRF. This invention also allows for the prioritization of critical vehicle data for transport over the vehicle mobile radio which ensures that this critical data is delivered in a timely fashion.

The policy(ies) to be applied on a per WTRU basis are selected based on an individual service level category assigned to the WTRU and triggered by various events. Generally, the method of applying the policy or controlling access to the core mobile network for configuration 1 comprises:

a. a user connecting its WTRU and establishing a connection to the core mobile network;
b. the vePCEF establishing a connection to the vePCRF and downloading and installing a set of control policies from the vePCRF for the connection which are based upon the service level category assigned to the WTRU and associated information for enforcement.
c. the vePCEF establishing or modifying a session for the connection of step a per the PCRF policies of step b;
d. the user sending and or receiving data through the user's WTRU
e. the vePCEF inspecting and classifying traffic data flows of the WTRU in accordance with the control policies;
f. the vePCEF taking actions in accordance with the control policies; and transmitting approved data to the core mobile network.

The policy(ies) to be applied on a per WTRU basis are selected based on an individual service level category assigned to the WTRU and triggered by various events. Generally, the method of applying the policy or controlling access to the core mobile network for configuration 2 comprises:

a. a user connecting its WTRU and establishing a connection to the core mobile network;
b. the vePCEF establishing a connection to the core mobile network PCRF and downloading and installing a set of control policies from the PCRF for the connection which are based upon the service level category assigned to the WTRU and associated information for enforcement.
c. the vePCEF establishing or modifying a session for the connection of step a per the PCRF policies of step b;
d. the user sending and or receiving data through the user's WTRU
e. the vePCEF inspecting and classifying traffic data flows of the WTRU in accordance with the control policies;
f. the vePCEF taking actions in accordance with the control policies; and transmitting approved data to the core mobile network.

vePCEF (Standalone Architecture)

With continuing reference to FIG. 1, a second embodiment of the invention implements a Policy and Charging Enforcement Function (vePCEF) in a vehicle using a cloud based Policy and Charging Rules Function (PCRF). In a stand-alone system the vePCEF would be accessing a remote or independent cloud-based network server that maintains the default policies separate from the core mobile network (service provider). Additionally, or alternatively, the policies can be customizable by the vehicle owner or an account administrator.

Periodic and or triggered updates go between the vePCEF and the cloud based PCRF. Triggered updates happen upon defined events, such as turning the car off or hitting a quota, for example.

The invention provides for the implementation of vePCEF functions in a vehicle. The invention provides for methods of controlling access to the vehicle mobile radio by users, the method is carried out with a policy management function architecture ("PCC") having a vePCEF with deep packet inspection capabilities located in the vehicle, and a policy and charging rules function located in the cloud based PCRF, wherein the vePCEF is initialized with policies obtained from the cloud based PCRF, which contain sets of pre-determined default policies that can be assigned by the vehicle owner/administrator. The vePCEF enforces the PCRF rules on a per WTRU basis.

Providing the policy control at the vehicle helps to reduce the traffic over the network bandwidth to the core mobile network. This invention allows a PCC function to be implemented in the vehicle which reduces the amount of network traffic and permits application of PCC at the WTRU level. It also permits a more accurate identification of traffic via the implementation of MITM which significantly improves the ability of the vePCEF to accurately implement the policies defined by the PCRF. This invention also allows for the prioritization of critical vehicle data for transport over the vehicle mobile radio which ensures that this critical data is delivered in a timely fashion.

The policy(ies) to be applied on a per WTRU basis are selected based on an individual service level category assigned to the WTRU and triggered by various events. Generally, the method of applying the policy or controlling access to the core mobile network comprises:

a. a user connecting its WTRU and establishing a connection to the core mobile network;
b. the vePCEF establishing a connection to the PCRF and downloading and installing a set of control policies from the PCRF for the connection which are based upon the service level category assigned to the WTRU and associated information for enforcement.
c. the vePCEF establishing or modifying a session for the connection of step a per the PCRF policies of step b;
d. the user sending and or receiving data through the user's WTRU
e. the vePCEF inspecting and classifying traffic data flows of the WTRU in accordance with the control policies;
f. the vePCEF taking actions in accordance with the control policies; and transmitting approved data to the core mobile network.

Man-in-the-Middle

The invention can optionally utilize a methodology known as Man-In-The-Middle (MITM) to more accurately identify encrypted traffic. This implementation would be implemented on the vehicle network access point, or optionally on a separate electronics module located between the vehicle network access point and the vehicle mobile radio. The location of this function, prior to the vehicle mobile radio, would be done at a point that is not considered part of the core mobile network and thus not subjecting the network to possible personal privacy issues. With this invention, the MITM function is an end user function and would be activated for use by the person who is responsible for the service agreement with the core mobile network. The MITM technique would be accepted as part of the policy and security solution when activated by the responsible person such as the vehicle owner or an account administrator.

The value of policy and policy enforcement is only as good as the ability to characterize the data traffic on the connection from the end device (either devices coming in hardwired [vehicle sensors] or via WiFi, WTRUs or other vehicle data). Today much of that data traffic (>70% and increasing) is encrypted. The Man in the Middle (MITM) functionality is a way of using DPI to more effectively view encrypted data traffic. By decrypting the data, the data can be better characterized, and the PCEF can more effectively apply the policy to the data.

MITM allows a module to sit in the path of the connection, decrypt the data, and more accurately characterize the data traffic for policy enforcement (e.g., preventing access to black listed sites, blocking specific applications, and recognizing security threats to the vehicle). This can be done with minimal performance impact and no functional impact to the end points. After the data is characterized for policy enforcement and prior to being transmitted beyond the vehicle, the data is re-encrypted.

The invention implements the MITM functionality in the vehicle on the connection between the Wi-Fi radio and the vehicle network radio.

The MITM would be implemented by the vehicle owner therefore approval is attained at the vehicle level and is not a "mandated" network wide deployment by the core mobile network service provider.

The MITM functionality can be used for any one or more of a host of applications as, for example, to, a) give priority to vehicle sensor data over WTRUs, b) ensures critical data gets through, c) block access to specific smart phone applications, such as social media, video games, and the like, d) block access to websites, e.g. black lists, e) provide time of day, day of week restrictions on usage, and f) provide device security—block malware, handle DDoS attacks, block access to malicious websites, and the like.

User Interface

A password protected user interface would be provided via a vehicle display unit or other interface for the person responsible to authorize vehicle passenger usage, to assign service level category, and to provide vehicle passenger WTRU security. The user interface could be via voice commands or screen-controlled input or any other method of authenticating the user. The user interface would provide a limited set of predefined policies, so they can be easily applied to each individual WTRU in the vehicle. Notifications and/or alarms will be presented at the user interface if any thresholds are exceeded, or other problems are detected. Optionally, the interface could be via a smartphone app or a computer using an https connection via a browser where a user with administrative credentials could provide the service level category assignments.

The invention provides for one or more of the following benefits:
a) Implementation of the vePCEF or the vePCRF and vePCEF functions in the vehicle. Pushing functionality out to the network edge can reduce the traffic on cellular networks.
b) Distributed functionality implements policy prior to traffic entering the core mobile network from the vehicle.
c) Reduces traffic on the core mobile network (bandwidth) and vehicle mobile radio.
d) Prevents DDoS attacks at the individual vehicle level— for example by having an integrated function with vePCEF to detect an excessive volume of incoming messages which could over load the processor and having the vePCEF block the excess messages.
e) Provides virus, bot, and malicious software prevention independent of the devices (either devices coming in hardwired [vehicle sensors] or via WiFi, WTRUs or other vehicle data) that are connected to the vehicle network access point by, for example, providing an integrated function in the vePCEF that identifies and blocks the virus, bot, and malicious software.
f) Provides ability to prioritize critical vehicle data information over WTRUs.
g) Provides unique policies on a WTRU basis.

FIGURES

Figure 2:
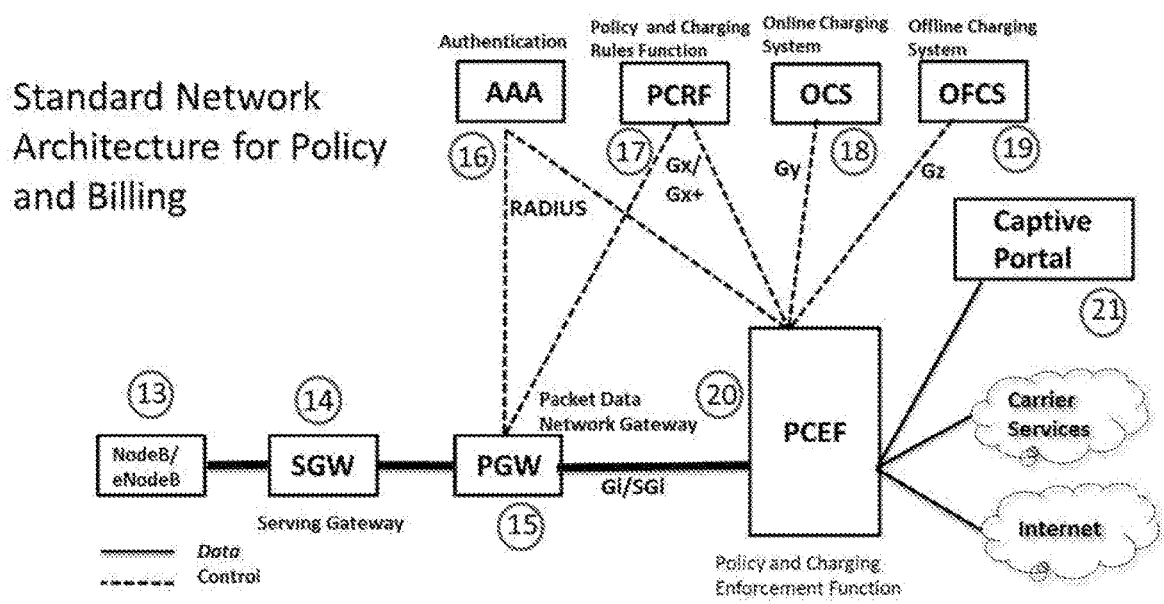
FIG. 2 depicts a typical network Architecture for Policy and Billing.

FIG. 2 depicts an exemplary architecture for policy and billing where the PCEF and PCRF are in the core mobile network. Data Flows from the WTRU to NodeB/eNodeB, through a Serving Gate Way (SGW) to the core mobile network, through a second PDN (Packet Data Network) gateway (PGW) which is in communication with the core mobile network PCRF and PCEF where various information authentication and charging functions are collecting data, and then out to the destination.

In FIG. 2, item 13 is NodeB/eNodeB—a base station that controls the WTRU's in one or more cells. The base station that is communicating with a WTRU is known as its serving eNodeB.

In FIG. 2, item 14: Serving Gate Way (SGW) acts as a network access point, and forwards data between the base station and the PDN gateway (PGW).

In FIG. 2, item 15: PGW—The Packet Data Network Gateway communicates with the outside world i.e. packet data networks PDN, using SGi interface. Each packet data network is identified by an access point name (APN).

In FIG. 2, item 16: AAA is an Authentication functionality.

In FIG. 2, item 17: PCRF—Policy and Charging Rules Function (PCRF) is part of the PCC (Policy and Charging and Control) and supports service data flow detection, policy enforcement, flow-based charging. PCRF manages policies to manage and control Quality of Service (QoS), charging, quota, optimization, and admission control.

In FIG. 2, item 18: Online Charging System (OCS)—is a system allowing a core mobile network service provider to charge their customers, in real time, based on service usage.

In FIG. 2, item 19: Offline Charging System (OFCS)—is a process where charging information for network resource usage is collected concurrently with that resource usage. It is used to generate offline billing records.

In FIG. 2, item 20 is a PCEF designed to enforce decisions received from the policy and charging rules function and relaying back access and subscriber information to the PCRF.

In FIG. 2, item 21 is a Captive Portal, a cloud-based server that provides applications and services offered by a network operator.

Figure 3:
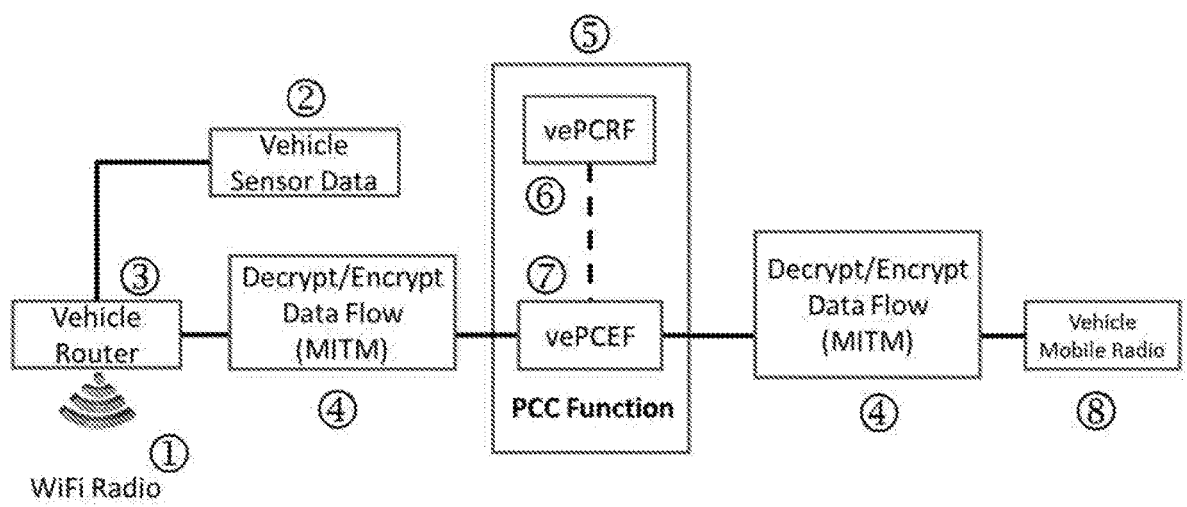
FIG. 3 depicts one embodiment of the present invention representing a connected vehicle architecture for Policy and Charging including the optional MITM (4) function.

FIG. 3 depicts one embodiment of the present invention representing the connected car architecture for policy and charging control including the optional MITM (4) function. FIG. 3 represents an in-vehicle policy management functionality architecture or charging and control architecture which includes in this embodiment a MITM functionality and deep packet inspection "DPI". In FIG. 3, a WiFi radio (1) is carrying traffic to and from the on-board vehicle WTRUs. The WiFi radio can follow the IEEE 802.11 WiFi standards. A WTRU accesses the WiFi radio (1) which transmits to the vehicle network access point (3). Vehicle sensor data (2) also accesses the vehicle network access point/WiFi Radio via WiFi or may be hardwired to the vehicle network access point. The vehicle network access point combines all the data and routes it to the MITM functionality. The data flow through a MITM (4) which performs a standard function of terminating the encrypted connection from the access devices in the vehicle (either devices coming in hardwired [vehicle sensors] or via WiFi, WTRUs or other vehicle data). This function decrypts the encrypted links. The data then flows to the vehicle PCC function (5) where the data goes into the vePCEF (7) to identify data flows for applying and enforcing the vePCRF policies (6), where deep packet inspection is performed, and the data is subjected to the policies of the vePCRF. The data then flows according to the applied policies through a second MITM (4) function re-encrypting the data. The data then flows through the vehicle mobile radio, through the core mobile network and ultimately to its destination. Incoming data coming in through the vehicle mobile radio flows through the process in reverse. The benefits of this architecture over the standard network architecture are that policies are applied within the vehicle which reduces the traffic and processing load on the core mobile network. This architecture allows for prioritization of data traffic prior to entry into the core mobile network permitting critical vehicle data to have priority over user data. The MITM functionality allows for more accurate and broader inspection and therefore the vePCEF can more effectively apply the vePCRF policies. This architecture can prevent DDoS attacks at a more granular level than core mobile network-based solutions. The devices (either devices coming in hardwired [vehicle sensors] or via WiFi, WTRUs or other vehicle data) behind the vehicle network access point can be protected from malware and viruses.

In FIG. 3, item 1—WiFi radio for managing traffic to and from the on-board WTRUs. The WiFi radio can follow the IEEE 802.11 WiFi standards.

In FIG. 3, item 2—Vehicles have many sensors that are collecting data on the status, condition, and performance of the vehicle. The information gathered needs to be sent to a network-based server for storage, analysis, and actions. These vehicle devices may connect via the WiFi signal or via a hardwired connection to the WiFi radio (1) or vehicle network access point (3) respectively.

In FIG. 3, item 3—vehicle network access point manages traffic to and from the on-board vehicle sensors/devices and to and from the WTRUs. The vehicle network access point combines the signals from multiple devices onto a single physical connection. The physical connection is routed to the MITM, vePCEF with deep packet inspection functionality "DPI", and vehicle mobile radio for access to the core mobile network.

In FIG. 3, item 4—The Man in the Middle (MITM) performs a standard function of terminating the encrypted connection from the access devices in the vehicle (either devices coming in hardwired or via WiFi). This function decrypts the encrypted connections and makes it easier for the vePCEF to identify data flows for applying and enforcing the vePCRF policies.

In FIG. 3, item 5—Policy management function or policy control and charging function (PCC) is a superset of 6 and 7. In the envisioned implementation, the vehicle PCC mirrors the core mobile network PCC function but performs it in the vehicle which is outside of the core mobile network and permits the implementation of the MITM function. The vehicle PCC must identify and permit (via security control) access to the core mobile network for all WTRUs. This security control will be implemented via the user interface and may include things like passwords, facial recognition, finger prints, voice print, iris recognition, and the like. Optionally, the vehicle PCC offers the ability to the core mobile network to be able to control subscriber services and network resources, and to charge for that control with an integrated framework of real-time policy management and charging. The in-vehicle implementation of the PCC function (vePCRF and vePCEF) provides that function within the vehicle and then syncs with the core mobile network PCC on a periodic or event triggered basis.

In FIG. 3, item 6—The policy and charging resource function (vePCRF) is a mirrored copy of the core mobile network PCRF. The policies will be downloaded from the core mobile network on certain trigger events and at certain periodicity to ensure the most recent policies definition for the vehicle are being used. The vePCRF must define policies for each service level category, e.g. child, pre-teen, teen, adult, and the like.

In FIG. 3, item 7—The policy and charging enforcement function (vePCEF) enforces the policies as defined by the vePCRF. It utilizes deep packet inspection (DPI) capability to identify data flows per WTRU and enforce the policies defined by the vePCRF. This can include things like blocking access, blocking data flows, providing priority to specific data flows, determining usage associated with specific charging policies, and the like.

In FIG. 3, item 8—The vehicle mobile radio takes the data streams and transmits this to the core mobile network where it is routed to its destination.

The benefits of this architecture over the standard network architecture include:
1. Policies are applied within the vehicle and reduces the traffic and processing load on the core mobile network,
2. Policies are applied on a per WTRU basis,
3. More accurate identification of WTRU applications can be achieved with the MITM implementation in the vehicle,
4. Prioritization of data to ensure critical vehicle data is not blocked or delayed,
5. Identification of DDoS attacks can be made at a more granular level and blocked more easily, and
6. Malware and viruses can be blocked for all devices (either devices coming in hardwired [vehicle sensors] or via WiFi, WTRUs or other vehicle data) behind the vehicle network access point.

Figure 4:
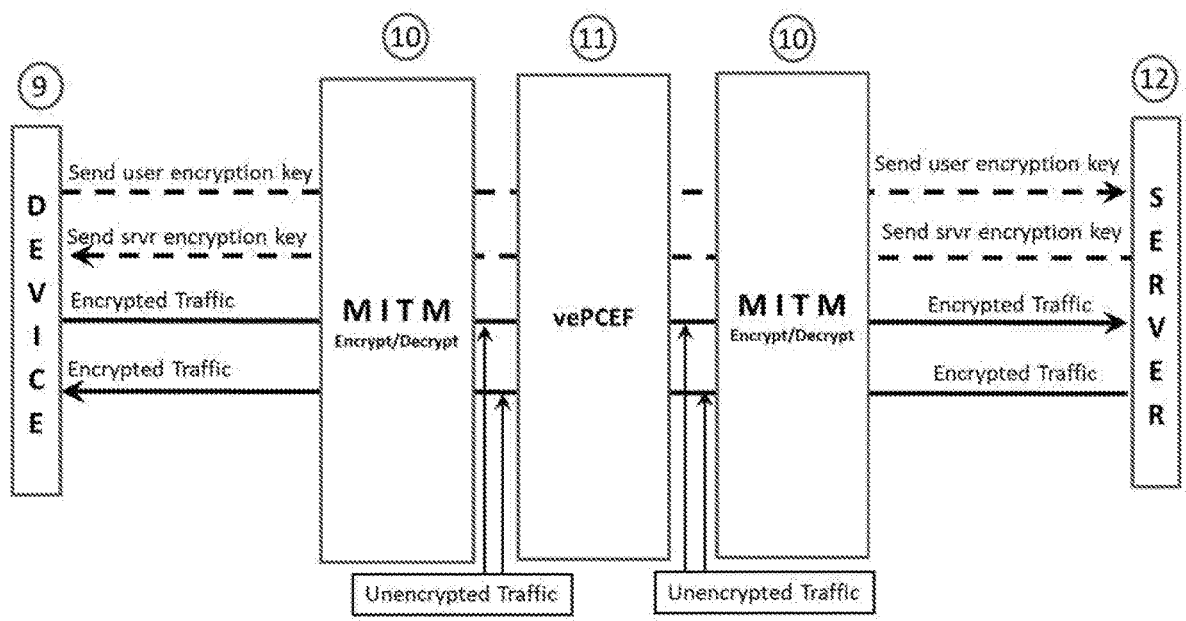
FIG. 4 depicts the MITM Function.

FIG. 4 depicts the MITM function. In FIG. 4, item 9—The device is any WTRU.

In FIG. 4, item 10—The Man in the Middle (MITM) performs a standard function of terminating the encrypted connection from the access devices in the vehicle (either devices coming in hardwired or via WiFi/WTRU or other vehicle data). This function decrypts the encrypted connections and makes it easier for the vePCEF to identify data flows for applying and enforcing the vePCRF or the PCRF (Cloud based or network) policies.

In FIG. 4, item 11—The vehicle policy management function or policy control and charging function (PCC) is a superset of item 6 and item 7. In the envisioned implementation, the vePCEF mirrors the core mobile network PCEF but performs it in the vehicle which is outside of the core mobile network and permits the implementation of the MITM function. The vehicle PCC must identify and permit (via security control) access to the core mobile network for all WTRUs. This security control will be implemented via the user interface and may include things like passwords, facial recognition, finger prints, iris recognition, and the like. Optionally, the vehicle PCC offers the ability to the core mobile network to be able to control subscriber services and network resources, and to charge for that control with an integrated framework of real-time policy management and charging. The in-vehicle implementation of the vePCEF provides that function within the vehicle and then syncs with the core mobile network PCC on a periodic or event triggered basis.

In FIG. 4, item 12—The server is an internet/cloud-based component that is the termination point for the device (item 9) data connections.

Figure 5:
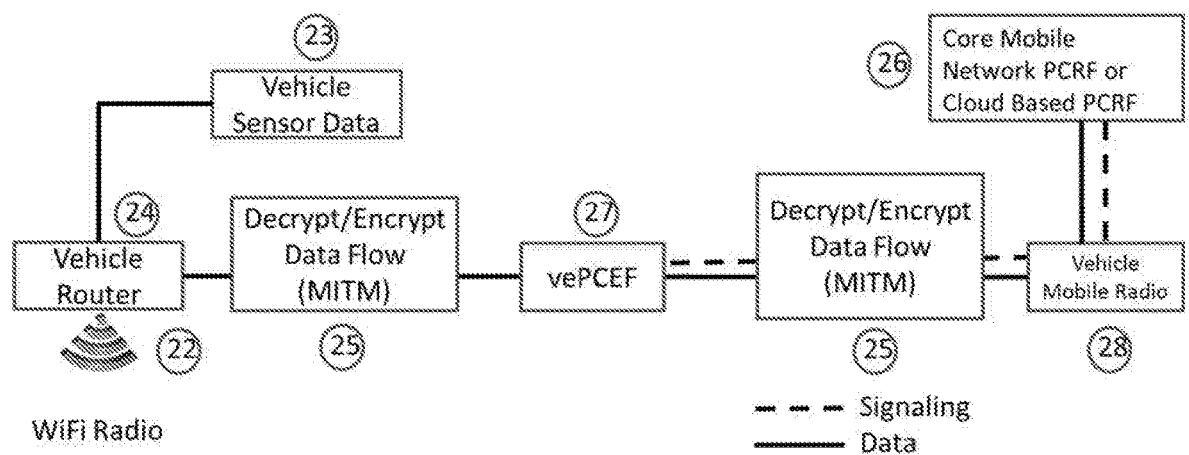
FIG. 5 depicts one embodiment of the present invention representing a connected vehicle architecture for Policy and Charging including the optional MITM (4) function.

The MITM of FIG. 4 can be the same MITM function as in FIG. 3 or 5.

FIG. 5 depicts one embodiment of the present invention representing the connected car architecture for policy and charging control including the optional MITM (25) function. FIG. 5 represents a partial in-vehicle policy management functionality architecture or charging and control architecture which includes in this embodiment a MITM functionality and deep packet inspection "DPI". In FIG. 5, a WiFi radio (22) is carrying traffic to and from the on-board vehicle WTRUs. The WiFi radio can follow the IEEE 802.11 WiFi standards. A WTRU accesses the WiFi radio (22) which transmits to the vehicle network access point (24). Vehicle sensor data (23) also accesses the vehicle network access point/WiFi Radio via WiFi or may be hardwired to the vehicle network access point. The vehicle network access point combines all the data and routes it to the MITM functionality. The data flow through a MITM (25) which performs a standard function of terminating the encrypted connection from the access devices in the vehicle (either devices coming in hardwired [vehicle sensors] or via WiFi, WTRUs or other vehicle data). This function decrypts the encrypted links. The data then flows into the vePCEF (27) to identify data flows for applying and enforcing the PCRF policies (26), where deep packet inspection is performed, and the data is subjected to the policies of the PCRF. The data then flows according to the applied policies through a second MITM (25) function re-encrypting the data. The data then flows through the vehicle mobile radio (28), through the core mobile network and ultimately to its destination. Incoming data coming in through the vehicle mobile radio flows through the process in reverse. The benefits of this architecture over the standard network architecture are that enforcement policies are applied within the vehicle which reduces the traffic and processing load on the core mobile network. This architecture allows for prioritization of data traffic prior to entry into the core mobile network permitting critical vehicle data to have priority over user data. The MITM functionality allows for more accurate and broader inspection and therefore the vePCEF can more effectively apply the PCRF policies. This architecture can prevent DDoS attacks at a more granular level than core mobile network-based solutions. The devices (either devices coming in hardwired [vehicle sensors] or via WiFi, WTRUs or other vehicle data) behind the vehicle network access point can be protected from malware and viruses.

In FIG. 5, item 22—WiFi radio for managing traffic to and from the on-board WTRUs. The WiFi radio can follow the IEEE 802.11 WiFi standards.

In FIG. 5, item 23—Vehicles have many sensors that are collecting data on the status, condition, and performance of the vehicle. The information gathered needs to be sent to a network-based server for storage, analysis, and actions. These vehicle devices may connect via the WiFi signal or via a hardwired connection to the WiFi radio (1) or vehicle network access point (3) respectively.

In FIG. 5, item 24—vehicle network access point manages traffic to and from the on-board vehicle sensors/devices and to and from the WTRUs. The vehicle network access point combines the signals from multiple devices onto a single physical connection. The physical connection is routed to the MITM, vePCEF with deep packet inspection functionality "DPI", and vehicle mobile radio for access to the core mobile network.

In FIG. 5, item 25—The Man in the Middle (MITM) performs a standard function of terminating the encrypted connection from the access devices in the vehicle (either devices coming in hardwired or via WiFi). This function decrypts the encrypted connections and makes it easier for the vePCEF to identify data flows for applying and enforcing the PCRF policies.

In FIG. 5, item 26—The core mobile network PCRF or the cloud based PCRF communicates with the vePCEF. The core mobile network PCRF or the cloud based PCRF must define policies for each service level category, e.g. child, pre-teen, teen, adult, and the like.

In FIG. 5, item 27—The policy and charging enforcement function (vePCEF) enforces the policies as defined by the core mobile network PCRF or the cloud based PCRF. It utilizes deep packet inspection (DPI) capability to identify data flows per WTRU and enforce the policies defined per WTRU by the PCRF. This can include things like blocking access, blocking data flows, providing priority to specific data flows, determining usage associated with specific charging policies, and the like.

In FIG. 5, item 28—The vehicle mobile radio takes the data streams and transmits this to the core mobile network where it is routed to its destination.

Registration Process

In one embodiment of the invention, a user initiating a connection to the WIFI radio in the vehicle must register prior to utilizing the core mobile network services. Each individual WTRU connecting to the WiFi radio must register with the system and be assigned a service level category involving permissions, access, and usage as defined by the service level category. A WTRU cannot be registered without the permission of the vehicle owner/administrator. The vehicle owner/administrator must assign a predefined service level category. Each WTRU will be identified by an available unique ID. Unique ID's include, but are not limited to, MAC address (media access control), IMEI (international mobile equipment identify), and MDN (mobile directory number) (phone number). The WTRU will then register with the vePCRF, if present in the vehicle, or with the PCRF in the mobile core or the cloud based PCRF, if the vePCRF is not present. The vePCRF or PCRF, if no vePCRF is present in the vehicle, creates a Login and Password that is associated with the unique ID. The WTRU will connect via WiFi radio and be identified by login and password associated with the unique ID.

For the Initial WTRU Registration, the WTRU will connect to the WiFi radio at which time the vePCRF, if present in the vehicle, or with the network or cloud based PCRF if no vePCRF is present, will identify the new WTRU WiFi radio connection. The vePCRF or the network or cloud based PCRF, if no vePCRF is present, will verify the unique ID against list of registered WTRUs. If the WTRU is not listed, it will be directed to proceed to the registration process. If the WTRU is on the list, it will be directed to proceed to the login process.

In the registration process the vePCRF or PCRF captures the WTRU's unique ID. A request for approval of access is sent to the vehicle owner or administrator. The vehicle owner/administrator then approves or denies the request. If access is denied by the vehicle owner/administrator, the WTRU is notified, the process stops and the WTRU will not be able to log into the WIFI radio nor access the vehicle mobile radio. If access is approved by vehicle owner/administrator, a request for service level category, will be requested to the administrator/vehicle owner. The administrator/vehicle owner will assign the service level category selected by the vehicle owner to the unique ID of the WTRU. Some of these possible service level categories could include:

Vehicle Owner
Adult Family Member
Teen Family Member
Pre-Teen Family Member
Young Child
Adult Guest
Teen Guest
Pre-Teen Guest
Young Child Guest.

Each service level category will have a predetermined set of policies associated with the given service level category determining level of access for that service level category. A WTRU login/password is requested. Specifications will be determined for the required complexity of the login and password, e.g. number of characters, types of characters required, and the like. The WTRU unique ID, service level category, login/password will be collected and stored in the vePCRF and/or network or cloud based PCRF. The vePCRF, if present in the vehicle, synchronizes with the core mobile network based PCRF or cloud based to store the WTRU information. The WTRU is then presented with the login process.

Service Level Category

In the case where there is a vePCRF located in the vehicle, the service level categories can be defined in the core mobile network based or cloud based PCRF which will be synced with the vePCRF. Optionally they can be defined in the vePCRF and then synchronized with the core mobile network based or cloud based PCRF. The vehicle owner/administrator will be given a login/password for accessing the network based or cloud based PCRF and or the vePCRF for the creation and definition of each service level category. In the case where the PCRF is the core mobile network based or cloud based PCRF, the service level categories can be defined in the core mobile network based or cloud based PCRF. The vehicle owner/administrator will be given a login/password for accessing the network based or cloud based PCRF for the creation and definition of each service level category. These can be menu items that are selected by the owner/administrator from drop down lists or "check box lists". The vehicle owner/administrator can login, select the desired service level categories or alternately the system can default to a pre-determined set of service level categories and which can optionally be over-ridden by the vehicle owner/administrator. Within each service level category, the owner/administrator can select the system default or can optionally override the defaults by selecting or deselecting options. Once complete the new service level category definitions are saved in the PCRF and or the vePCRF, as the case may be. Service level category definitions can be edited/modified at any time, but the new definitions will not be active until the next time the WTRU logs in.

Login Process

For the case where there is a vePCRF located in the vehicle, when a WTRU connects to the WiFi radio and the unique ID has verified it as a registered WTRU, the vePCRF initiates the login process. A login/password screen is presented to the WTRU. A login and password are entered. The login and password are then verified against the information stored in the vePCRF. The core mobile network PCRF and the vePCRF are synchronized on a periodic basis and on pre-defined triggers, e.g. power on, power off, changes made to login/password, re-assignment of category, and the like. If the login and password match, the WTRU is permitted to access the core mobile network using the associated service level category. The vePCEF then enforces the policy defined for that WTRU based on the information stored in the vePCRF.

For the case where the PCRF is the network or cloud based PCRF, when a WTRU connects to the WiFi radio and the unique ID has verified it as a registered WTRU, the PCRF initiates the login process. A login/password screen is presented to the WTRU. A login and password are entered. The login and password are then verified against the information stored in the PCRF. If the login and password match, the WTRU is permitted to access the core mobile network using the associated service level category. The vePCEF then enforces the policy defined for that WTRU based on the information stored in the PCRF.

Termination Process

The WTRU connection can be terminated in multiple ways such as:
1. The User terminates the connection by logging off.
2. User terminates the connection by turning the WTRU off.
3. User disconnects the WTRU from the vehicle WiFi radio.
4. The vehicle owner forces the termination via the in-vehicle control screen.
5. The vehicle is turned off.
6. User leaves the service area of the vehicle WiFi.

Following termination, regardless of termination method, the power is to be maintained to the vePCRF and vePCEF until the vePCRF and vePCEF synchronization with the core mobile network PCRF and PCEF are completed and verified. In the case where there is no vePCRF, the power would be maintained to the vePCEF until synchronization with the core mobile network or cloud based PCRF and PCEF are completed. If for any reason the synchronization fails, the vePCRF and vePCEF should store the information and attempt to synchronize on the next connection.

Aspects of the invention include:

Aspect 1. A method of controlling access to mobile radio connection(s) in a vehicle, the method carried out with a policy and charging control "PCC" architecture having a policy and charging enforcement function with deep packet inspection capabilities "vePCEF" located in the vehicle and in communication with a PCRF, wherein the PCRF is preset with a set of predefined policies that can be applied to an user's WTRU connecting to the WiFi radio, the method including the steps of:
  a) a user connecting its WTRU and establishing a connection to the core mobile network through the vehicle mobile radio;
  b) the vePCEF establishing a connection to the PCRF and downloading and installing a set of control policies from the PCRF for the connection which are based upon a service level category assigned to the WTRU and associated information for enforcement.
  c) the vePCEF establishing or modifying a session for the connection of step a) per the PCRF policies of step b);
  d) the user sending and or receiving data through the user's WTRU
  e) the vePCEF inspecting and classifying traffic data flows of the WTRU in accordance with the control policies;
  f) the vePCEF taking actions in accordance with the control policies; and transmitting approved data to the core mobile network.

Aspect 2. The method of aspect 1, wherein the PCRF comprises a vePCRF located in the vehicle.

Aspect 3. The method of Aspect 1 or 2, wherein the step of establishing a connection includes the step of the WTRU providing a user password to authenticate its connection.

Aspect 4. The method of aspect 1 or 2, wherein the step of establishing a connection includes the step of the WTRU providing a voice command to authenticate its connection.

Aspect 5. The method of any of aspects 1 to 4, wherein the vePCEF is updated by syncing with a core mobile network PCEF.

Aspect 6. The method of any of aspects 2 to 5, wherein the vePCRF is updated by syncing with a core mobile network PCRF.

Aspect 7. The method of any of aspects 1 to 6, further including implementing a MITM methodology including, prior to the vePCEF, decrypting the data; the decrypted data then being subjected to the vePCEF, the vePCEF applying a deep packet inspection on the data to identify each data flow and enforcing the PCRF policy; and the data then being re-encrypted prior to transmission to the core mobile network.

Aspect 8. The method of any of aspects 1 to 7, wherein, if any policies are violated by WTRU, a notification is sent to the user interface.

Aspect 9. The method of any of aspects 1 to 8, wherein if any policies are violated an alarm is triggered.

Aspect 10. The method of any of aspects 1 to 9, wherein each WTRU is assigned a service level category.

Aspect 11. The method of any of aspects 1 to 10, wherein the policy(s) to be applied to the WTRU are selected based on the service level category assigned.

Aspect 12. The method of any of aspects 1 to 11, wherein the service level category is selected from the group consisting of vehicle owner, adult family members, teen family members, pre-teen family members, young children family members, adult guests, teen guests, pre-teen guests and young children guests.

Aspect 13. The method of any of aspects 2 to 12, wherein the vePCRF, and the vePCEF are combined in one module.

Aspect 14. The method of any of aspects 2 to 13, wherein the vePCRF contains policies prioritizing critical vehicle data information over WTRU data.

Aspect 15. The method of any of aspects 1 to 14, wherein the vePCEF prioritizes the data, wherein the critical vehicle data information is given priority over user WTRU data on the mobile radio.

Aspect 16. A vehicle containing a mobile radio architecture comprising a policy and charging control "PCC" architecture having a policy and charging enforcement function with deep packet Inspection capabilities "vePCEF", and a MITM functionality which decrypts the data prior to entering the vePCEF and re-encrypts the data after the vePCEF and before transmitting to the core mobile network.

Aspect 17. The vehicle of Aspect 16 wherein the PCC architecture of the vehicle further includes a policy and charging rules function "vePCRF".

Aspect 18. The vehicle of Aspect 17, wherein the vePCRF is predefined with a set of preset policies.

Aspect 19. The vehicle of any of aspects 17 to 18, wherein the vePCRF comprises service level categories defined by the vehicle owner/administrator or are predefined categories.

Any aspect of the invention can be combined with one or more other aspects.

We claim:

1. A method of controlling access to a mobile radio connection in a vehicle, the method carried out with a policy and charging control ("PCC") architecture having a policy and charging enforcement function ("PCEF") with deep packet inspection capabilities located in the vehicle ("vePCEF") and in communication with a policy and charging rules function ("PCRF"), wherein the PCRF is preset with a set of predefined policies that can be applied to a wireless transmit/receive unit ("WTRU") connecting to the WiFi radio, the method comprising the steps of:
a) connecting a WTRU and establishing a connection to the core mobile network through the vehicle mobile radio;
b) the vePCEF establishing a connection to the PCRF and downloading and installing a set of policies from the PCRF which are based upon a service level category assigned to the WTRU for enforcement;
c) the vePCEF establishing or modifying a session for the connection of step a) per the PCRF policies of step b);
d) sending and/or receiving data through the WTRU;
e) the vePCEF inspecting and classifying traffic data flows of the WTRU in accordance with the control policies; and
f) the vePCEF taking actions in accordance with the control policies and transmitting approved data to the core mobile network;
g) wherein the PCRF comprises a vePCRF located in the vehicle that provides network access control policies to the vePCEF independent of the core mobile network.

2. The method of claim 1, wherein the step of establishing a connection of step a) includes the step of the WTRU providing a user password to authenticate its connection.

3. The method of claim 1, wherein the step of establishing a connection of step a) further comprises the step of the WTRU providing user verification or authorization.

4. The method of claim 1, wherein the vePCEF is updated by syncing with a core mobile network PCEF.

5. The method of claim 1, wherein the vePCRF is updated by syncing with a core mobile network PCRF.

6. The method of claim 1, further comprising the steps of implementing a MITM methodology, the MITM methodology comprising, prior to the vePCEF, decrypting the data; the decrypted data then being subjected to the vePCEF; the vePCEF applying a deep packet inspection on the data to identify each data flow and enforcing the PCRF policy; and the data then being re-encrypted prior to transition to the core mobile network.

7. The method of claim 1, wherein, if any predefined policies are violated by WTRU, a notification is sent to the user interface.

8. The method of claim 1, wherein, if any predefined policies are violated, an alarm is triggered.

9. The method of claim 1, further comprising the step of assigning a service level category to each WTRU.

10. The method of claim 9, further comprising the step of selecting the policy to be applied to the WTRU are selected based on the service level category assigned.

11. The method of claim 9, wherein the service level category is selected from the group consisting of vehicle owner, adult family members, teen family members, pre-teen family members, young children family members, adult guests, teen guests, pre-teen guests and young children guests.

12. The method of claim 1, wherein the vePCRF, and the vePCEF are combined in one module.

13. The method of claim 1, wherein the vePCRF contains policies prioritizing critical vehicle data information over WTRU data.

14. The method of claim 1, wherein the vePCEF prioritizes the data, wherein the critical vehicle data information is given priority over user WTRU data on the mobile radio.

15. A vehicle containing a mobile radio architecture comprising a policy and charging control ("PCC") architecture having a policy and charging enforcement function ("PCEF") with deep packet Inspection capabilities in the vehicle ("vePCEF"), and a man-in-the-middle ("MITM") functionality which decrypts the data prior to entering the vePCEF and re-encrypts the data after the vePCEF and before transmitting to a core mobile network, wherein the PCC architecture of the vehicle further includes a policy and charging rules function located in the vehicle ("vePCRF") that provides network access control policies to the vePCEF independent of the core mobile network.

16. The vehicle of claim 15, wherein the vePCRF is predefined with a set of preset policies.

17. The vehicle of claim 15, wherein the vePCRF comprises service level categories defined by the vehicle owner or the administrator or are predefined categories.

18. A system for controlling policy management functionality in a vehicle, the system comprising:

a vehicle network access device;

a WiFi radio for connecting a wireless transmit/receive unit ("WTRU") used in the vehicle with the vehicle network access device; and a vehicle mobile radio for interfacing with a standalone network that maintains policies independently from the core mobile network;

wherein the policy management functionality is employed after the vehicle access network device but before the vehicle mobile radio;

wherein the policy management functionality comprises a policy and charging enforcement function ("PCRF") with deep packet inspection capabilities located in the vehicle ("vePCEF") and in communication with a policy controls rules function ("PCRF"), wherein the PCRF is preset with a set of predefined policies that can be applied to the WTRU connecting to the WiFi radio or vehicle data sensors; and wherein the PCRF comprises a vePCRF located in the vehicle that provides network access control policies to the vePCEF independent of the core mobile network.

19. The system of claim 18 wherein the vePCEF communicates with a cloud-based PCRF.

20. The system of claim 18 wherein the vePCEF communicates with a core mobile network PCRF.

21. The system of claim 18 wherein the policy management functionality comprises a policy and charging rules function in the cloud (PCRF) and a policy and charging enforcement function with deep packet inspection capabilities in the vehicle (vePCEF), wherein the vePCEF initialize with policies obtained from a PCRF, from an independent network server, which contain sets of pre-determined default policies.

22. The system of claim 20 wherein the default polices are assigned by the vehicle owner or administrator.

23. The system of claim 18 further comprising a man-in-the-middle (MITM) methodology for identifying encrypted data.

24. The system of claim 23 wherein the vehicle network access device comprises the MITM functionality.

25. The system of claim 23 further comprising an electronics module that comprises the MITM functionality.

26. The system of claim 25 wherein the MITM functionality is implemented by the vehicle owner.

27. The system of claim 18 further comprising a password protected user interface.

28. The system of claim 18 further providing a service level category per WTRU.

29. The method of claim 1, wherein the vePCRF is updated by syncing with a cloud based PCRF.

* * * * *